(12) United States Patent
Myers et al.

(10) Patent No.: US 12,185,709 B1
(45) Date of Patent: Jan. 7, 2025

(54) VISIBLE FISH STRIKE INDICATORS

(71) Applicant: Aaron Myers, Bossier City, LA (US)

(72) Inventors: Aaron Myers, Bossier City, LA (US); Ashton Poole, Benton, LA (US)

( * ) Notice: Subject to any disclaimer, the term of this patent is extended or adjusted under 35 U.S.C. 154(b) by 0 days.

(21) Appl. No.: 18/202,595

(22) Filed: Jun. 28, 2023

(51) Int. Cl.
  *A01K 93/02* (2006.01)

(52) U.S. Cl.
  CPC .................... *A01K 93/02* (2013.01)

(58) Field of Classification Search
  CPC ....................................... A01K 93/02
  See application file for complete search history.

(56) References Cited

U.S. PATENT DOCUMENTS

| | | | | |
|---|---|---|---|---|
| 2,252,358 A * | 6/1941 | Tosi | ........................ | A01K 93/02 439/375 |
| 2,448,681 A * | 9/1948 | Nutter | ..................... | A01K 93/02 362/802 |
| 2,464,309 A * | 3/1949 | Harshman | ............... | A01K 93/02 362/802 |
| 2,517,479 A * | 8/1950 | Grimm | ................... | A01K 93/02 43/17 |
| 2,642,691 A * | 6/1953 | Harshman | ............... | A01K 93/02 362/802 |
| 2,869,274 A * | 1/1959 | Seigle | ..................... | A01K 93/02 43/17 |
| 3,693,278 A * | 9/1972 | Mahone, Jr. | ............ | A01K 93/02 43/43.1 |
| 4,669,990 A * | 6/1987 | McDermott | .............. | B63C 9/21 441/16 |
| 5,615,512 A * | 4/1997 | Wang | ...................... | A01K 93/02 43/17 |
| 5,829,181 A * | 11/1998 | Fielder | .................... | A01K 93/02 43/17 |
| 5,974,721 A * | 11/1999 | Johnson | .................. | A01K 93/02 43/17 |
| 6,098,332 A * | 8/2000 | Wang | ...................... | A01K 93/02 43/16 |
| 7,225,580 B1 * | 6/2007 | Chou | ...................... | A01K 93/02 43/17 |
| 8,635,803 B1 * | 1/2014 | Cartwright | ............. | A01K 93/02 43/44.88 |

(Continued)

*Primary Examiner* — Monica L Perry
*Assistant Examiner* — Brittany A Lowery
(74) *Attorney, Agent, or Firm* — R. Keith Harrison

(57) ABSTRACT

Visible fish strike indicators may include a buoyant main housing having a horizontal center axis and a center of gravity beneath the horizontal center axis, whereby the main housing is configured to normally float in an upright horizontal position on a water body. A light-transmissible light housing having a light housing interior may be detachably supported by the main housing. An indicator illumination assembly may be supported by the main housing. The indicator illumination assembly may include at least one tilt switch configured to sense a vertical positioning event in which the main housing deploys from the upright horizontal position to a vertical position. A power source may interface with the tilt switch. A strike indicator light may interface with the tilt switch and the power source. The strike indicator light may be configured to emit a strike light pattern in the light housing. The tilt switch may be configured to energize the strike indicator light to emit the strike light pattern upon sensing the vertical positioning event.

20 Claims, 14 Drawing Sheets

(56) References Cited

U.S. PATENT DOCUMENTS

2014/0150328 A1\* 6/2014 Harrell .................. A01K 93/02
                                                                              43/17
2017/0055510 A1 3/2017 Harrell \* cited by examiner

VISIBLE FISH STRIKE INDICATORS

FIELD

Illustrative embodiments of the disclosure generally relate to fishing accessories. More particularly, illustrative embodiments of the disclosure relate to visible fish strike indicators which are buoyant and are configured to support an immersed fishing lure in a water body and provide visual indication to a remote user when a fish has struck the lure.

SUMMARY

Illustrative embodiments of the disclosure are generally directed to visible fish strike indicators which are buoyant and are configured to support an immersed fishing lure in a water body and provide visual indication to a remote user when a fish has struck the lure. An illustrative embodiment of the visible fish strike indicators may include a buoyant main housing having a horizontal center axis and a center of gravity beneath the horizontal center axis, whereby the main housing is configured to normally float in an upright horizontal position on a water body. A light-transmissible light housing having a light housing interior may be detachably supported by the main housing. An indicator illumination assembly may be supported by the main housing. The indicator illumination assembly may include at least one tilt switch configured to sense a vertical positioning event in which the main housing deploys from the upright horizontal position to a vertical position. A power source may interface with the tilt switch. A strike indicator light may interface with the tilt switch and the power source. The strike indicator light may be configured to emit a strike light pattern in the light housing. The tilt switch may be configured to energize the strike indicator light to emit the strike light pattern upon sensing the vertical positioning event.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 14. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Unless expressly or implicitly indicated otherwise, throughout the description and the appended claims, the terms "comprise", "comprising", "comprised of" and the like are to be construed in an inclusive sense as opposed to an exclusive or exhaustive sense, and are equivalent to the phrase, "including but not limited to". Each embodiment disclosed herein can comprise, consist essentially of, or consist of its particular stated element, step, ingredient, or limitation. As used herein, the transition term "comprise", "comprises", "includes", "including", "has", or "having" means "includes, but is not limited to, and allows for the inclusion of unspecified elements, steps, ingredients, or limitations, even in major amounts". The transitional phrase "consisting of" excludes any element, step, ingredient, or limitation not specified. The transition phrase "consisting essentially of" shall limit the scope of the embodiment to the specified elements, steps, ingredients, or limitations and to those that do not materially affect the embodiment.

Figure 14:
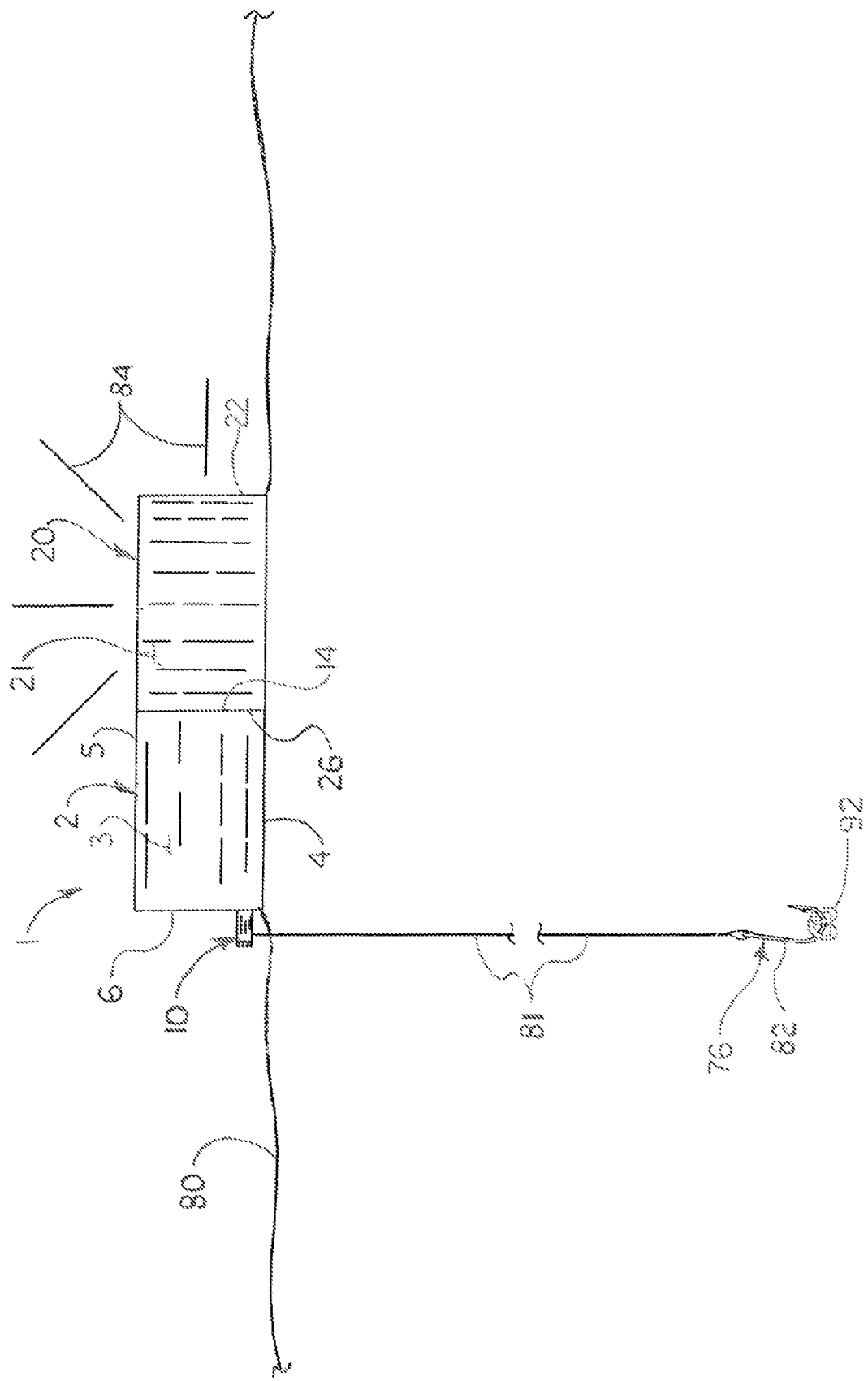
FIG. 14 is a side view of the illustrative visible fish strike indicator, floating in the horizontal position on a water body with a fishing line attached to the indicator and a fishing lure on the fishing line, more particularly illustrating a pre-strike light pattern emitted from the light housing of the indicator to indicate to a remote user that a fish has not struck the fishing line.
Figure 15:
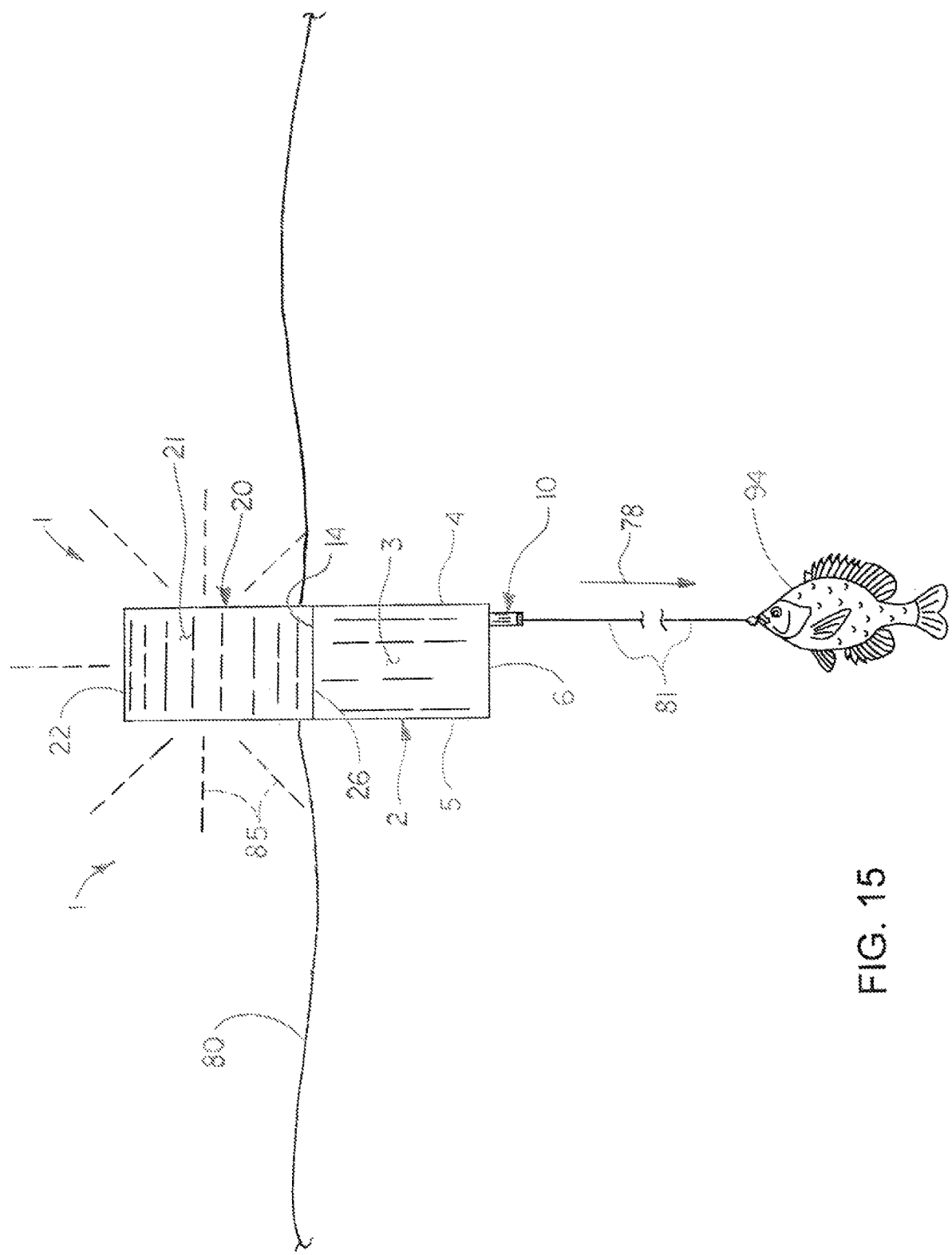
FIG. 15 is a side view of the floating visible fish strike indicator illustrated in FIG. 14 as a fish strikes the fishing lure on the fishing line and pulls the indicator from the horizontal position illustrated in FIG. 14 to a vertical position on the water body, more particularly illustrating a strike light pattern emitted from the light housing of the indicator to indicate that the fish has become hooked on the fishing line.
Figure 16:
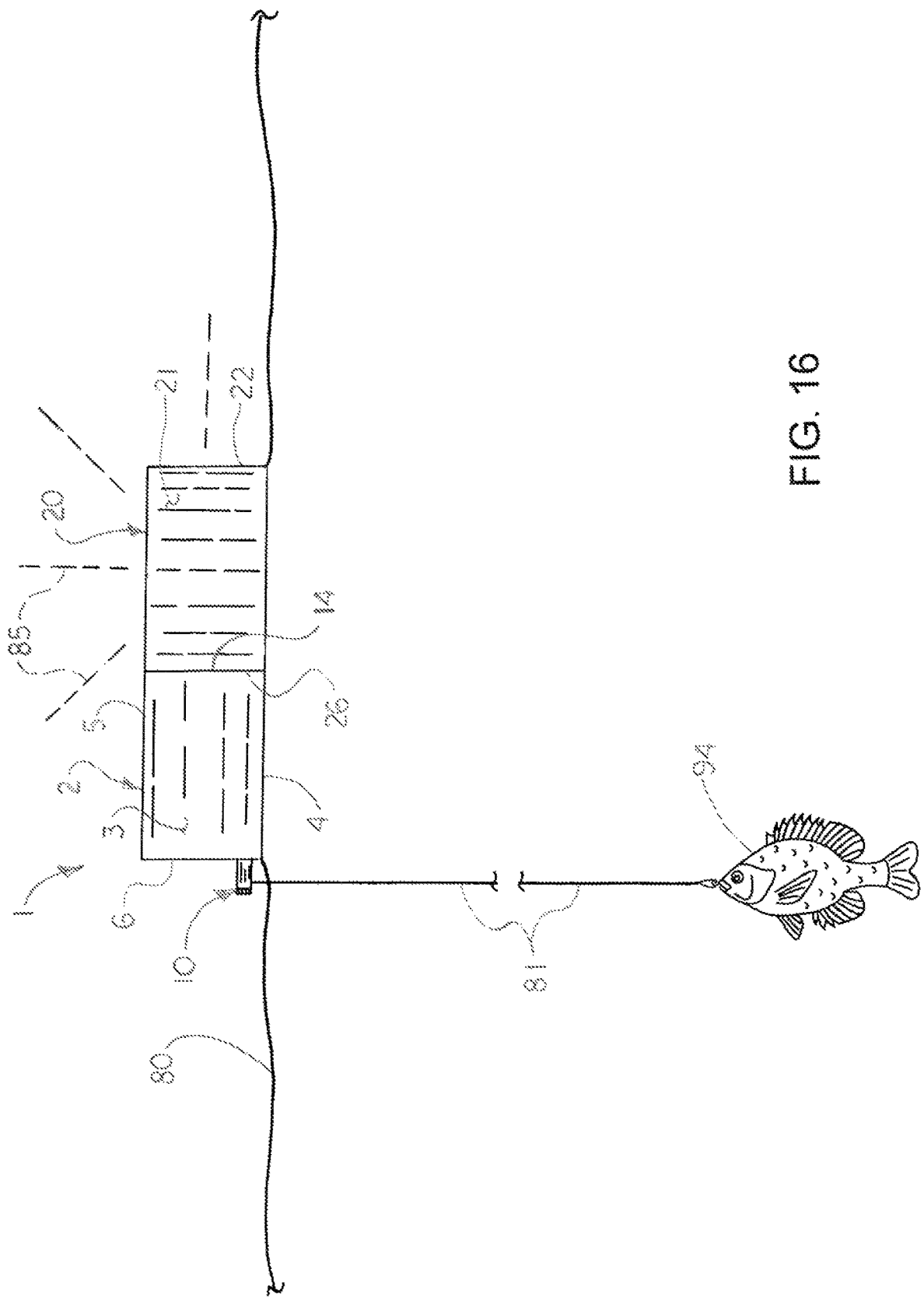
FIG. 16 is a side view of the floating visible fish strike indicator illustrated in FIG. 14 after the indicator has re-oriented to the horizontal position on the water body, with continued emission of the strike light pattern from the light housing of the indicator to indicate the presence of the fish on the fishing line to the remote user.

Referring to the drawings, an illustrative embodiment of the visible fish strike indicator, hereinafter indicator, is generally indicated by reference number 1. As illustrated in FIGS. 14-16, in typical application of the indicator 1, which will be hereinafter further described, a fishing line 81, to which is attached a fishing lure 76 such as an artificial fishing lure (not illustrated) or a fishing hook 82 with live bait 92 thereon, as illustrated in FIG. 14, may be attached to the indicator 1. The indicator 1 may be floated on the surface of a lake, pond, river, or other water body 80 in an upright horizontal position with the fishing lure 76 submerged beneath the surface of the water body 80.

As illustrated in FIG. 14, the indicator 1 may be configured to emit a pre-strike light pattern 84 as it remains in the upright horizontal position on the water body 80. The pre-strike light pattern 84 may indicate to a remote user of the indicator 1 that a fish 94 (FIG. 15) has not become hooked on the fishing line 81, particularly at night or in a dark environment, typically as the user views the indicator 1 from the bank, a boat, or the like at a distance from the indicator 1. As illustrated in FIG. 15, as it subsequently strikes the fishing lure 76 and is hooked on the fishing line 81, the fish 94 may exert a downward force 78 on the fishing line 80. In the resulting vertical positioning event, the downward force 78 may re-orient the indicator 1 to an angled or vertical position, hereinafter vertical position, on the water body 80. The indicator 1 may be configured to responsively emit a strike light pattern 85, which differs from the pre-strike light pattern 84, responsive to the vertical positioning event. The indicator 1 may be configured to continue to emit the strike light pattern 85 after it subsequently returns to the upright horizontal position and as the fish 94 remains on the fishing line 81, as illustrated in FIG. 16. The strike light pattern 85 may indicate to the remote user that the fish 94 is hooked on the fishing line 81 such that the user can then approach and retrieve the indicator 1 for removal of the fish 94 from the fishing lure 76.

The pre-strike light pattern 84 and the strike light pattern 85 emitted by the indicator 1 may differ from each other by color, pattern, brightness, light combinations, and/or other visual characteristic(s). For example and without limitation, in some embodiments, the pre-strike light pattern 84 may be green, whereas the strike light pattern 85 may be blue. Additionally or alternatively, the pre-strike light pattern 84 may be continuous whereas the strike light pattern 85 may be blinking or intermittent, or vice-versa.

Figure 1:
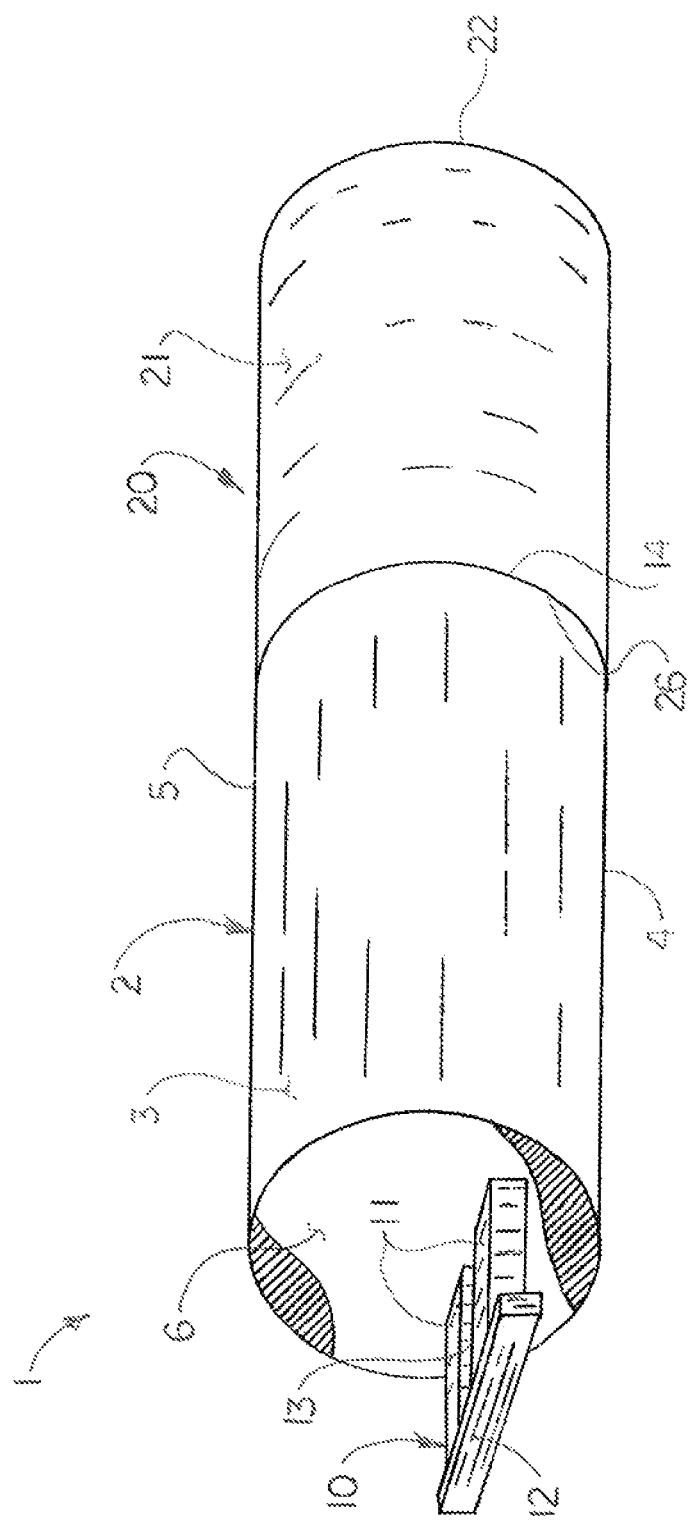
FIG. 1 is a perspective view of an illustrative embodiment of the visible fish strike indicators.
Figure 2:
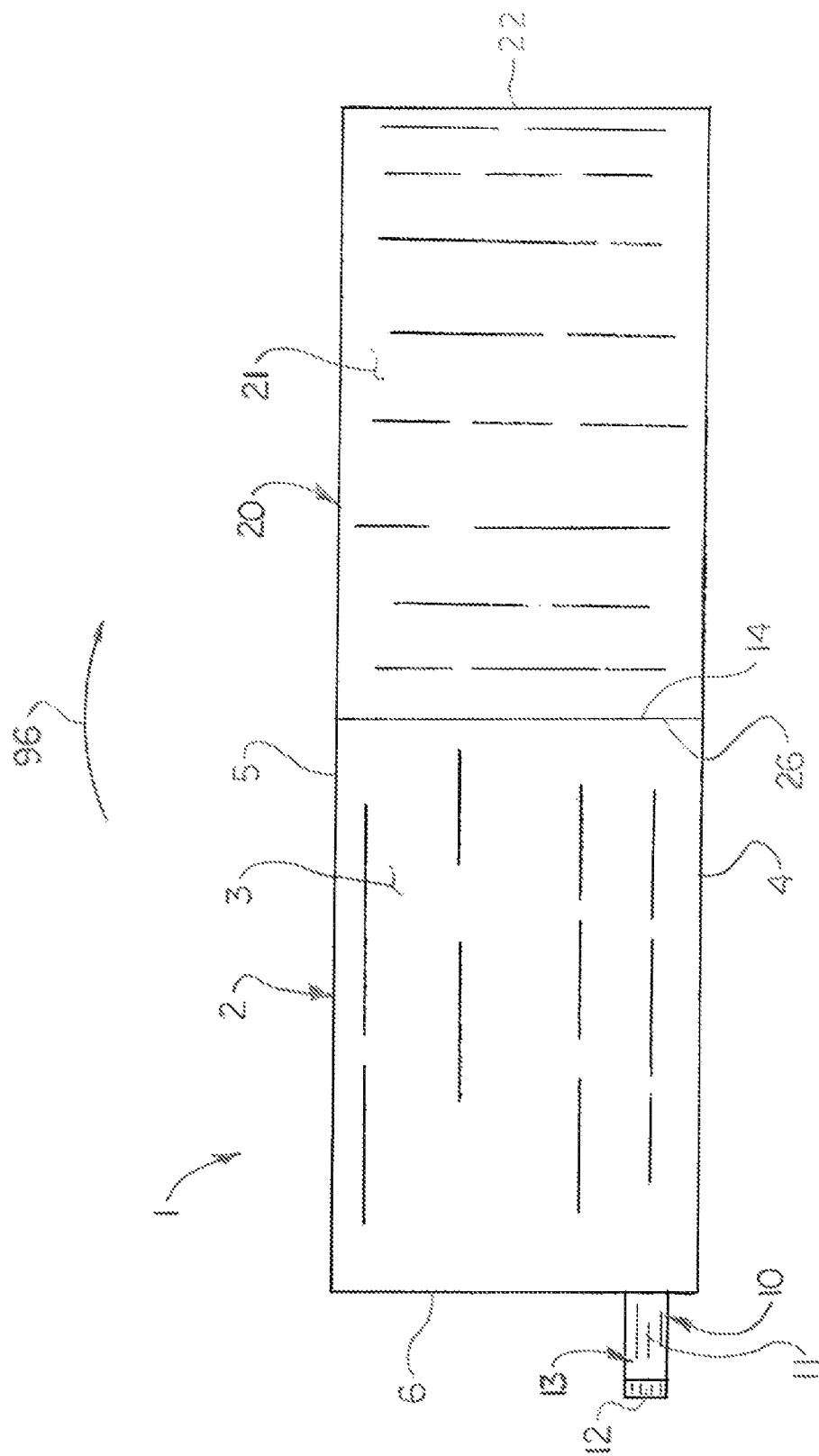
FIG. 2 is a side view of the illustrative visible fish strike indicator illustrated in FIG. 1.
Figure 3:
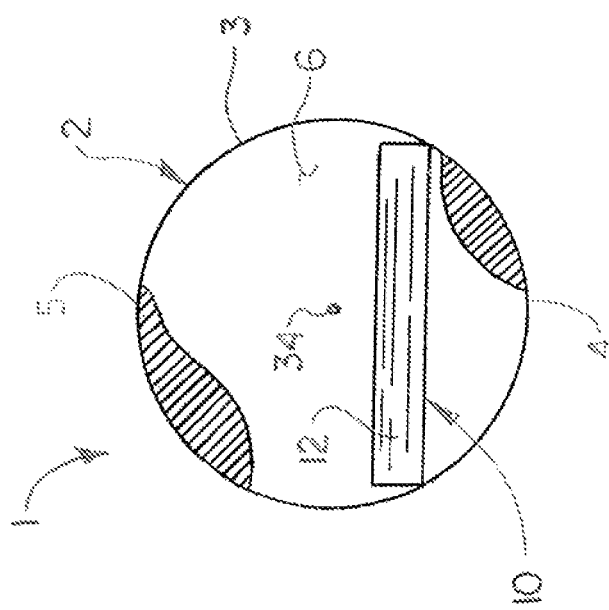
FIG. 3 is an end view of the illustrative visible fish strike indicator.
Figure 4:
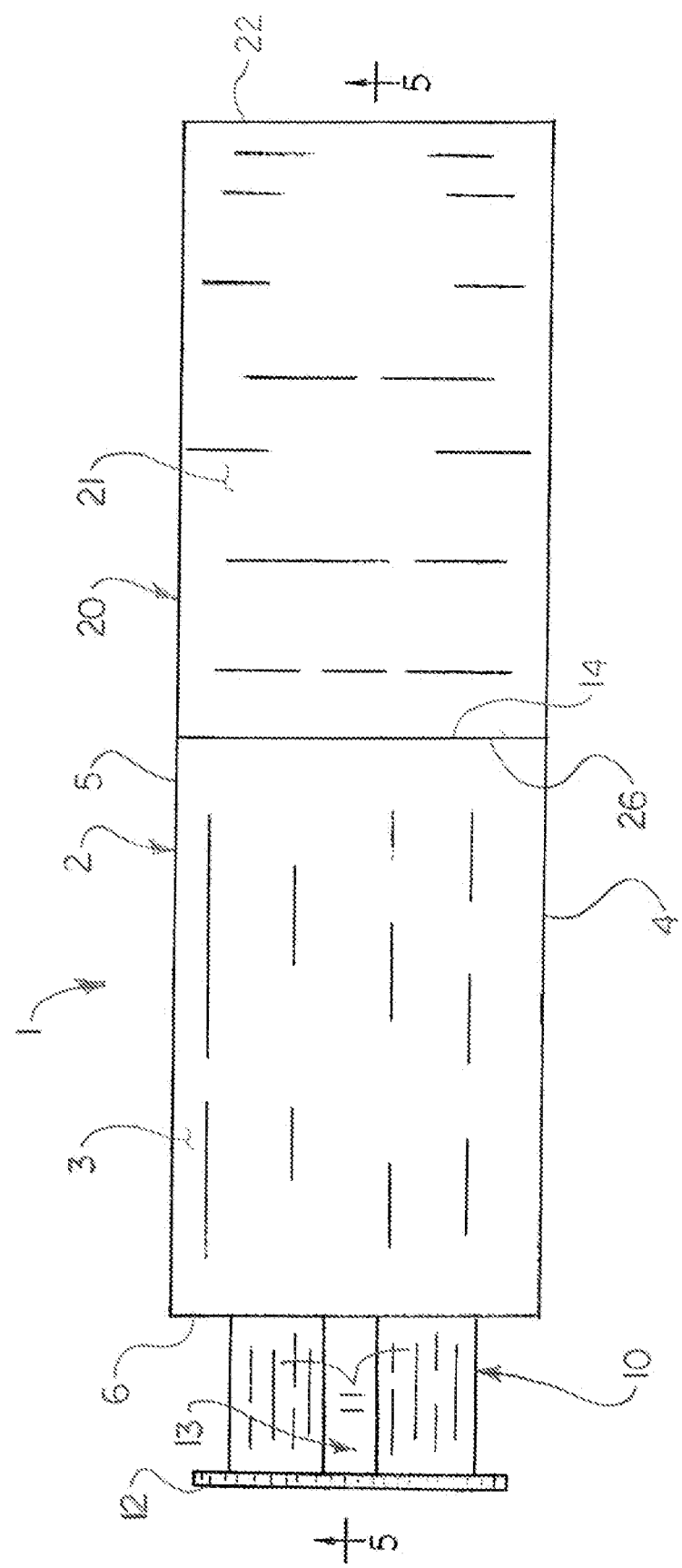
FIG. 4 is a top view of the illustrative visible fish strike indicator.
Figure 5:
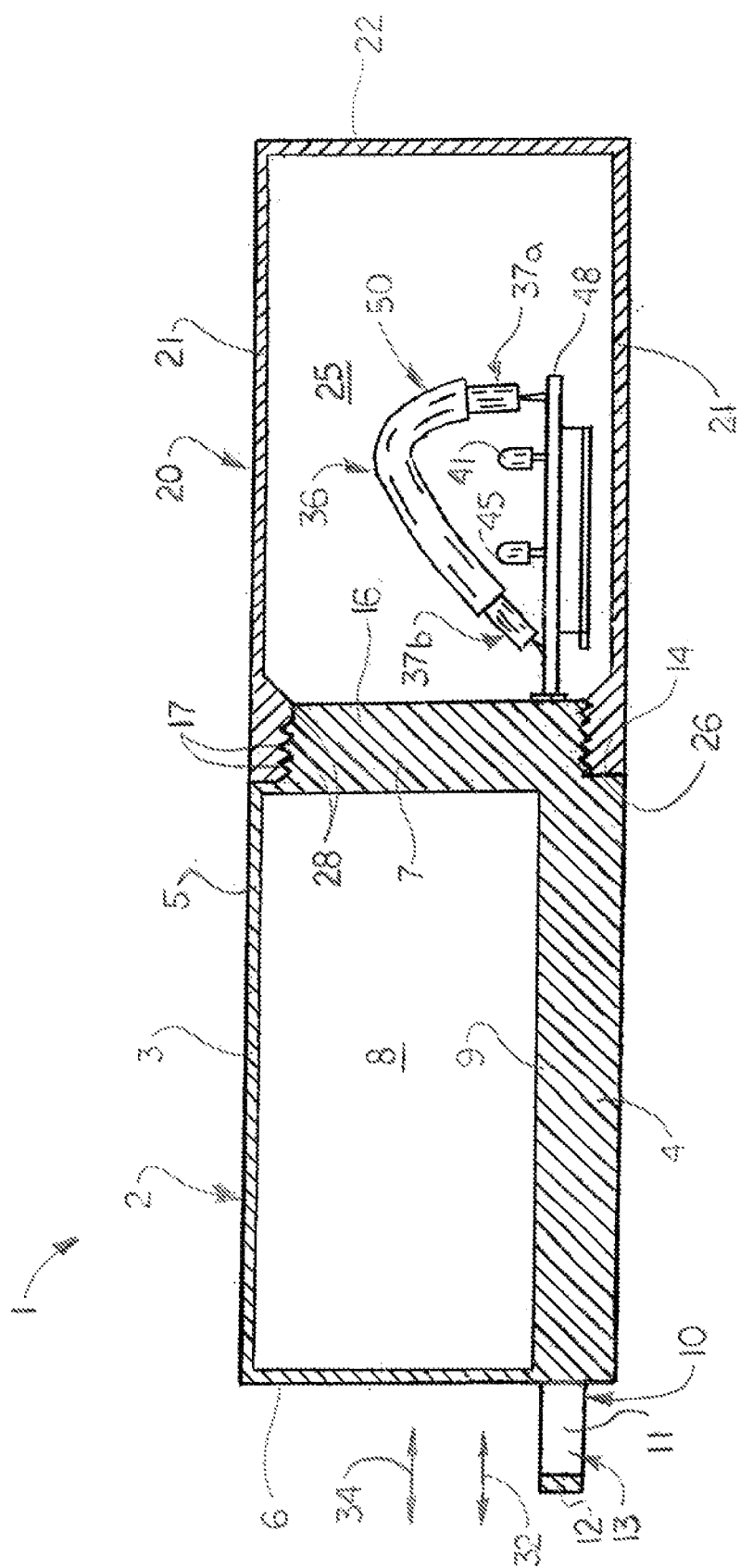
FIG. 5 is a longitudinal sectional view, taken along section lines 5-5 in FIG. 4, of the illustrative visible fish strike indicator, with a light housing attached to a main housing of the indicator and a typical indicator illumination assembly in the light housing.

As illustrated in FIGS. 1-6, the indictor 1 may include a buoyant main housing 2. As illustrated in FIG. 5, the main housing 2 may have a horizontal center axis 34. In the upright horizontal position of the indicator 1 on the water body 80, as illustrated in FIG. 14, the center of gravity 32 of the main housing 2 may be disposed beneath the horizontal center axis 34 of the main housing 2. Accordingly, the low center of gravity 32 of the main housing 2 may configure the main housing 2 and the indicator 1 to normally float horizontally on the water body 80 in an upright position by preventing rotation of the main housing 2 about the horizontal center axis 34.

Figure 6:
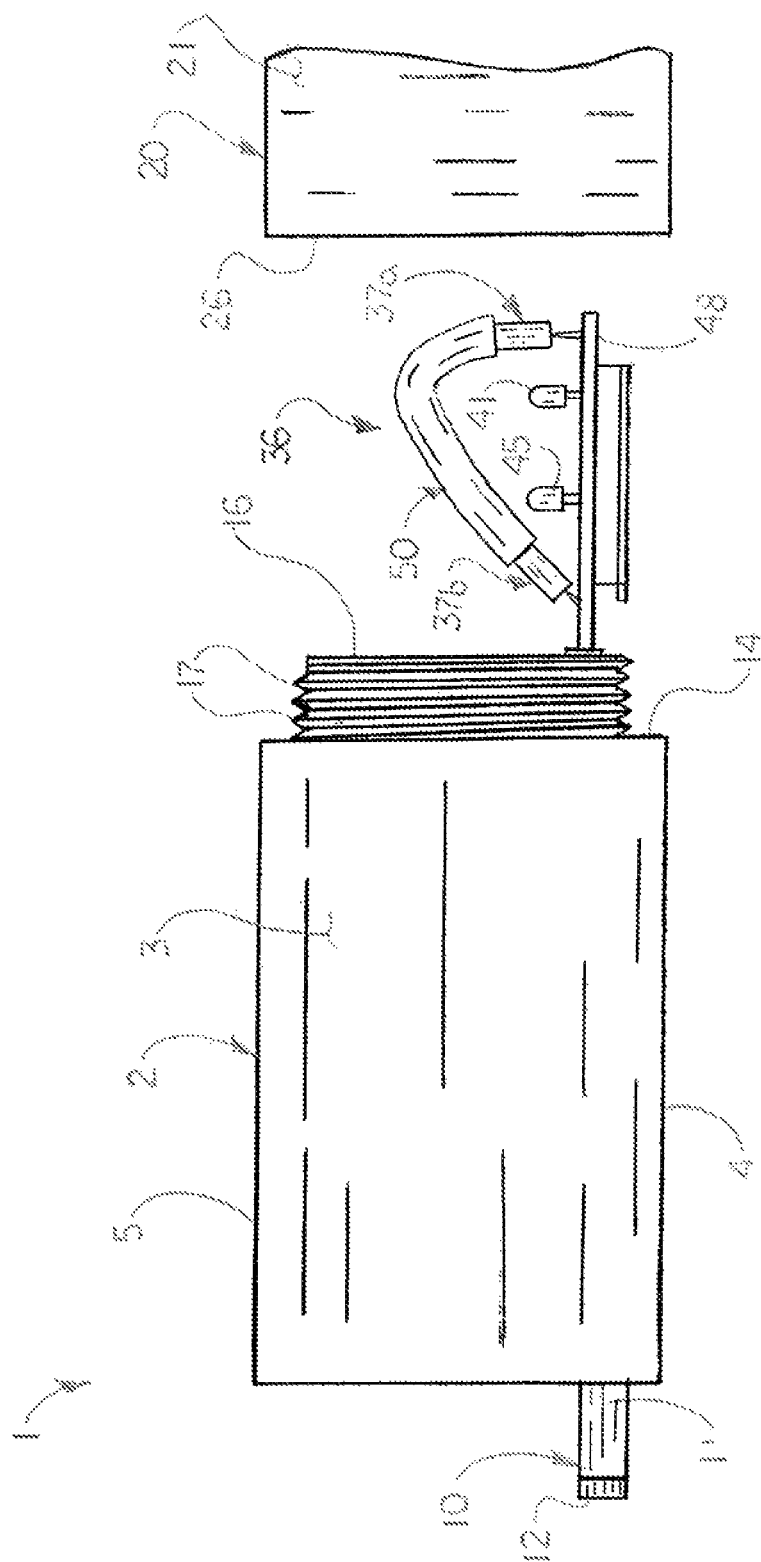
FIG. 6 is an exploded side view, partially in section, of the illustrative visible fish strike indicator, with the light housing removed from the main housing of the indicator to expose the indicator illumination assembly.
Figure 13:
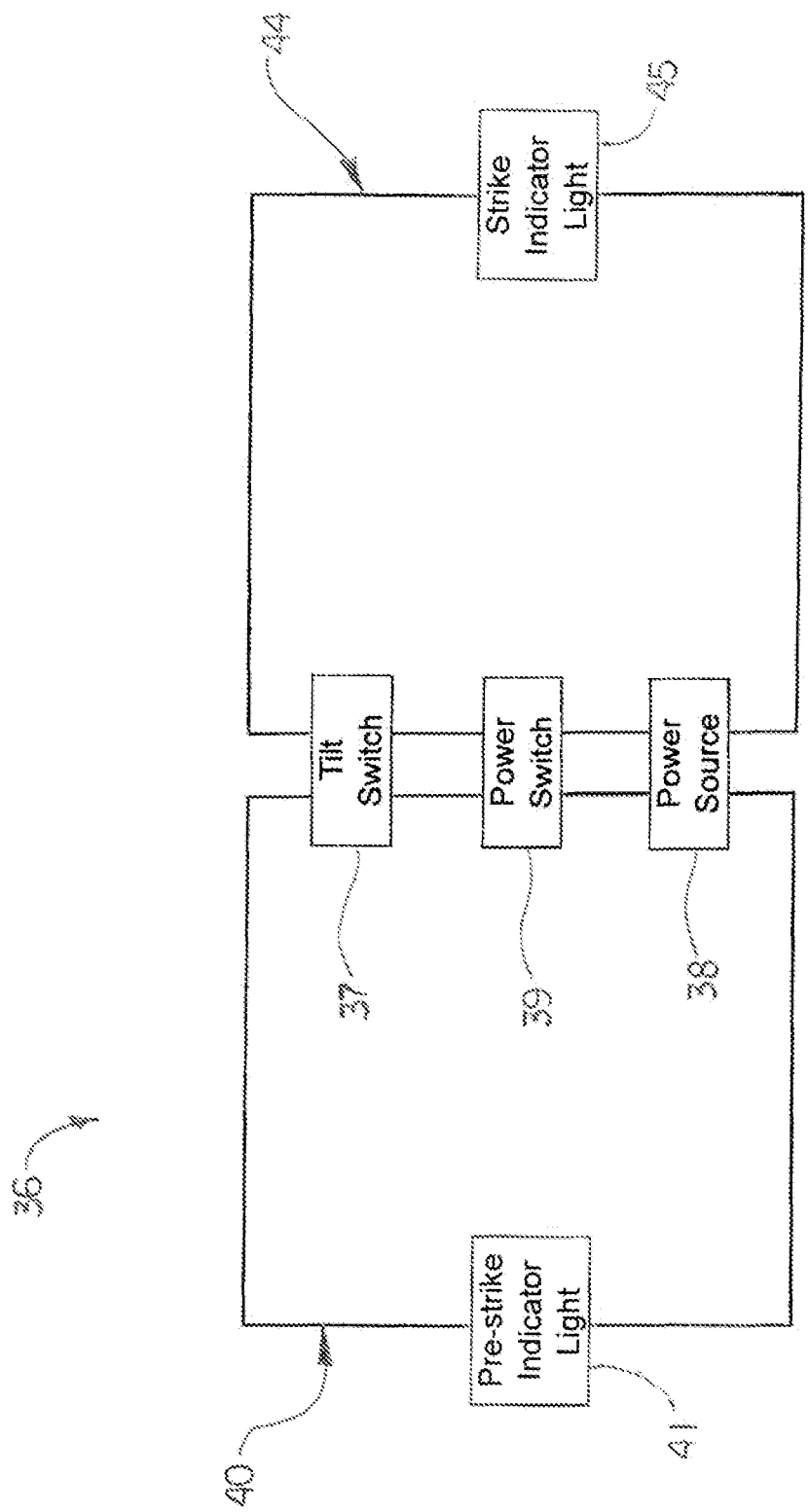
FIG. 13 is a functional block diagram of a typical indicator illumination assembly suitable for implementation of the visible fish strike indicator.

As illustrated in FIGS. 5 and 6, an indicator illumination assembly 36 may be supported by the main housing 2. As illustrated in FIG. 13, the indicator illumination assembly 36 may include at least one tilt switch 37, hereinafter tilt switch 37. The tilt switch 37 of the indicator illumination assembly 36 may be configured to sense the horizontal and vertical positions of the indicator 1 as well as the vertical positioning event in which the indicator 1 deploys from the upright horizontal position (FIG. 14) to the vertical position (FIG. 15).

A horizontal position circuit 40, having a pre-strike indicator light 41, and a vertical position circuit 44, having a strike indicator light 45, may electrically interface with the tilt switch 37 of the indicator illumination assembly 36. The horizontal position circuit 40 and the vertical position circuit 44 may include at least one power source 38. The tilt switch 37 may be configured to close the horizontal position circuit 40 and energize the pre-strike indicator light 41 to emit the pre-strike light pattern 84 as the indicator 1 remains in the upright horizontal position in the absence of the vertical positioning event, as illustrated in FIG. 14. The tilt switch 37 may be configured to open the horizontal position circuit 40 and close the vertical position circuit 44 to energize the strike indicator light 45 responsive to the vertical positioning event in which the fish 94 strikes the fishing line 81 and reorients the indicator 1 from the upright horizontal position to the vertical position, as illustrated in FIG. 15. The tilt switch 37 may be configured to maintain the closed position of the vertical position circuit 44 and continue to energize the strike indicator light 45 upon return of the indicator 1 from the vertical position back to the upright horizontal position as the fish 94 remains on the fishing line 81, as illustrated in FIG. 16.

The power source 38 may include any source which is capable of storing and supplying electrical current to the tilt switch 37, the pre-strike indicator light 41, and the strike indicator light 45. For example and without limitation, in some embodiments, the power source 38 may include at least one rechargeable and/or disposable battery.

In some embodiments, the horizontal position circuit 40 and the vertical position circuit 44 may include at least one power switch 39. The power switch 39 may facilitate selective manual actuation of the horizontal position circuit 40 and the vertical position circuit 44. The power switch 39 may have an "OFF" position and an "ON" position to de-energize and energize, respectively, the horizontal position circuit 40 and the vertical position circuit 44.

In some embodiments, a transparent or translucent light housing 20, having a light housing interior 25, as illustrated in FIG. 5, may extend from the main housing 2. The indicator illumination assembly 36 may be disposed in the light housing interior 25 of the light housing 20. Accordingly, the pre-strike indicator light 41 may be configured to emit the pre-strike light pattern 84, and the strike indicator light 45 may be configured to emit the strike light pattern 85, from the light housing 20.

As illustrated in FIGS. 1-6, in some embodiments, the main housing 2 of the indicator 1 may have a main housing sidewall 3. As illustrated in FIG. 5, the main housing sidewall 3 of the main housing 2 may include a lower main housing sidewall portion 4, an upper main housing sidewall portion 5, an exterior main housing end wall 6, an interior main housing end wall 7, and a main housing interior 8. As illustrated in FIG. 14, the lower main sidewall housing 4 of the main housing sidewall 3 may be configured to rest on the surface of the water body 80 as the indicator 1 floats on the water body 80. As further illustrated in FIG. 5, the exterior main housing end wall 6 and the interior main housing end wall 7 may close opposite ends of the main housing interior 8 at respective ends of the main housing sidewall 3.

A ballast portion 9 may be provided at the lower main housing sidewall portion 4 of the main housing sidewall 3. The ballast portion 9 may impart a higher weight to the lower main housing sidewall portion 4 than to the upper main housing sidewall portion 5.

Accordingly, the ballast portion 9 may facilitate the lower center of gravity 32 relative to the horizontal center axis 34 of the main housing 2. The ballast portion 9 may include any structure, element, component, particulate composition, solid composition, or any combination thereof which impart(s) the additional weight to the lower main housing sidewall portion 4 relative to the upper main housing sidewall portion 5 of the main housing sidewall 3. For example and without limitation, in some embodiments, the ballast portion 9 may include a thickening of the lower main housing sidewall portion 4 relative to the upper main housing sidewall portion 5.

In some embodiments, at least one line attachment cleat 10 may extend from the main housing 2 to facilitate attachment of the fishing line 81 (FIGS. 14-16) to the indicator 1. For example and without limitation, in some embodiments, the line attachment cleat 10 may extend from the exterior main housing sidewall 6 of the main housing 2. As illustrated in FIG. 5, in some embodiments, the line attachment cleat 10 may be disposed beneath the horizontal center axis 34 of the main housing 2.

The line attachment cleat 10 may have any design or construction which facilitates secure attachment of the fishing line 81 to the indicator 1. The line attachment cleat 10 may additionally facilitate winding of the fishing line 81 thereon for transportation and/or storage purposes. Accordingly, as illustrated in FIG. 4, in some embodiments, the line attachment cleat 10 may include at least one, and typically, a pair of parallel, spaced-apart cleat arms 11 which extend from the main housing 2 of the indicator 1. A cleat head 12 may terminate the extending ends of the cleat arms 11. In some embodiments, a cleat slot 13 may extend between the cleat arms 11. In typical attachment of the fishing line 81 to the line attachment cleat 10, one end of the fishing line 81 may be securely tied to one of the cleat arms 11. The fishing line 81 may be wound around the cleat arms 11 and the fishing lure 76 tied to the opposite, free end of the fishing line 81. The main housing 2 and the line attachment cleat 10 of the indicator 1 may be fabricated of plastic, composite materials, fiberglass, closed cell extruded polystyrene foam (STYROFOAM™), polyethylene foam, and/or other suitable materials.

The light housing 20 may have any design which is suitable to facilitate emission of the pre-strike light pattern 84 and the strike light pattern 85 from the indicator 1. Accordingly, as illustrated in FIG. 5, in some embodiments, the light housing 20 may have a light housing sidewall 21, a light housing end wall 22, and the light housing interior 25. The light housing sidewall 21 and the light housing end wall 22 may be transparent, translucent, or otherwise light transmissible. The light housing sidewall 21 may have a light housing shoulder 26 which is opposite the light housing end wall 22. In some embodiments, the light housing sidewall 21 may be configured for detachable attachment to the main housing 2, typically as will be hereinafter described. The light housing 20 of the indicator 1 may be fabricated of plastic, composite materials, fiberglass, closed cell extruded polystyrene foam (STYROFOAM™), polyethylene foam, and/or other suitable materials.

In some embodiments, the light housing 20 may be detachably attachable to the main housing 2 of the indicator 1 using any method or technique which is suitable for the purpose. For example and without limitation, as further illustrated in FIG. 5, in some embodiments, the main housing sidewall 3 of the main housing 2 may have a recessed housing shoulder 14. A housing nipple 16 may protrude from the housing shoulder 14. The housing nipple 16 may have external nipple threads 17. Housing shoulder threads 28 may recede from the light housing shoulder 26 on the interior surface of the light housing sidewall 21 of the light housing 20. The shoulder threads 28 of the light housing 20 may be configured for rotatable engagement with the companion nipple threads 17 on the housing nipple 16 of the main housing 2 to facilitate detachable and fluid-sealing attachment of the light housing 20 to the main housing 2 as the light housing shoulder 26 engages the housing shoulder 14 on the main housing 2.

Figure 11:
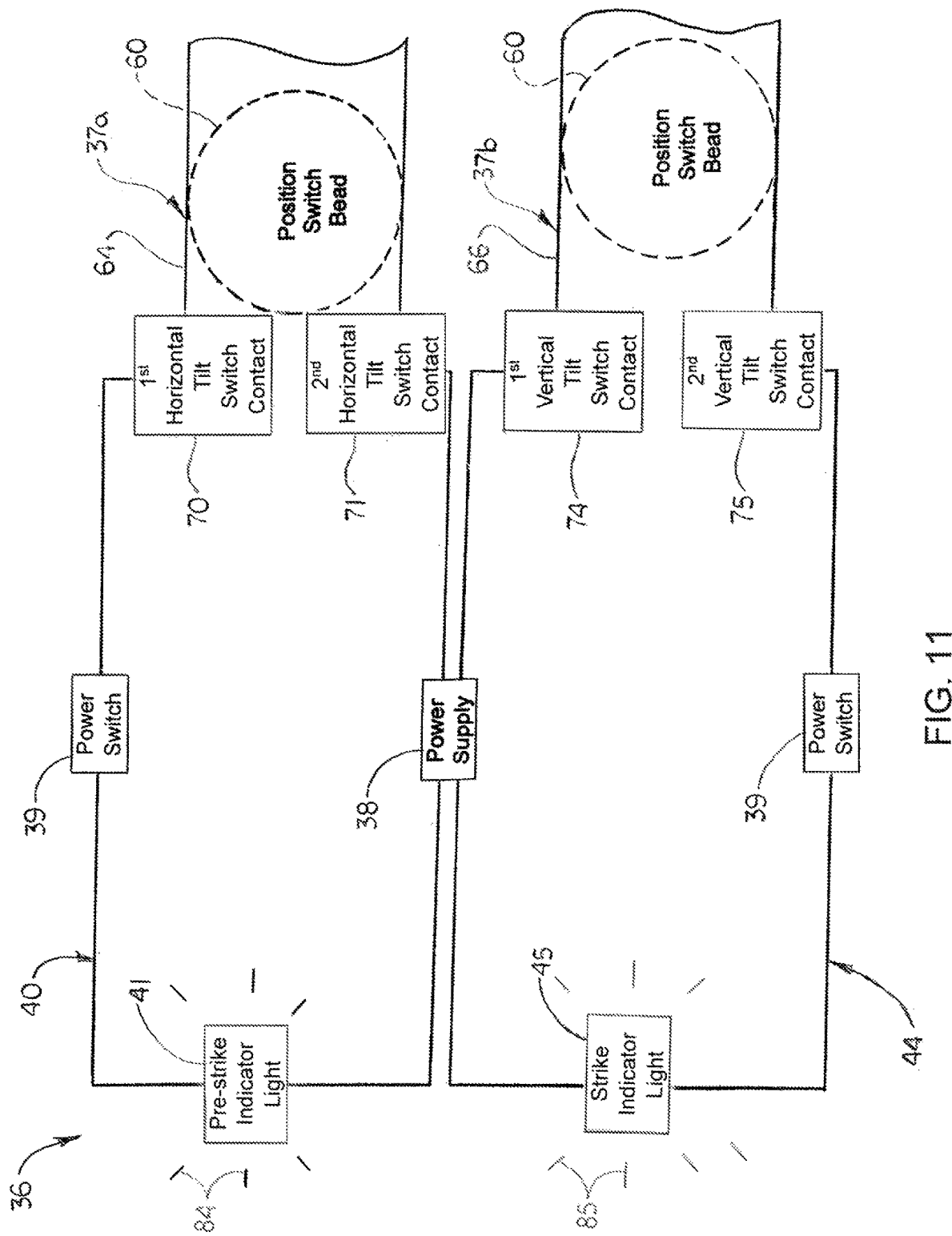
FIG. 11 is a functional block diagram of the indicator illumination assembly illustrated in FIG. 5, with the position switch bead (illustrated in phantom) closing the horizontal tilt switch in the horizontal position of the visible fish strike indicator.
Figure 12:
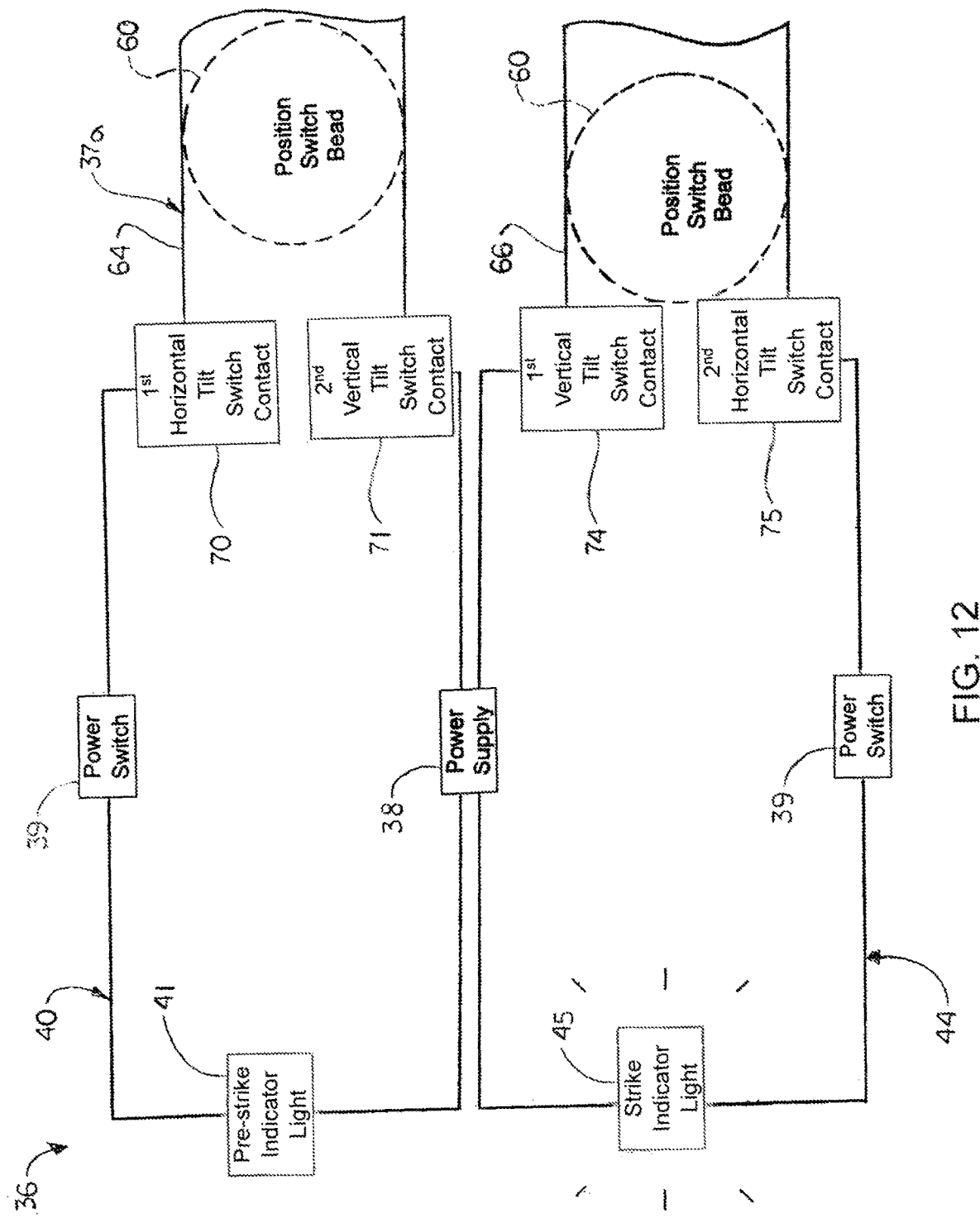
FIG. 12 is a functional block diagram of the indicator illumination assembly illustrated in FIG. 5, with the position switch bead (illustrated in phantom) closing the vertical tilt switch in the vertical position of the visible fish strike indicator.

In some embodiments, the indicator illumination assembly 36 may be positioned on the main housing 2 in such a manner that the indicator illumination assembly 36 tilts within a vertical tilt plane 42 (FIG. 7) as the indicator 1 deploys from the upright horizontal position (FIG. 14) to the vertical position (FIG. 15). Accordingly, as illustrated in FIGS. 11 and 12, the horizontal position circuit 40 of the indicator illumination assembly 36 may include a horizontal tilt switch 37a. The vertical position circuit 44 of the indicator illumination assembly 36 may include a vertical tilt switch 37b. As illustrated in FIGS. 5-9, an assembly support 48 may support the horizontal tilt switch 37a and the vertical tilt switch 37b. The assembly support 48 may protrude from the interior main housing end wall 7 of the main housing 2 into the light housing interior 25 of the light housing 20, as illustrated in FIG. 5. The horizontal tilt switch 37a and the vertical tilt switch 37b may be provided in spaced-apart relationship to each other on the assembly support 48.

Figure 7:
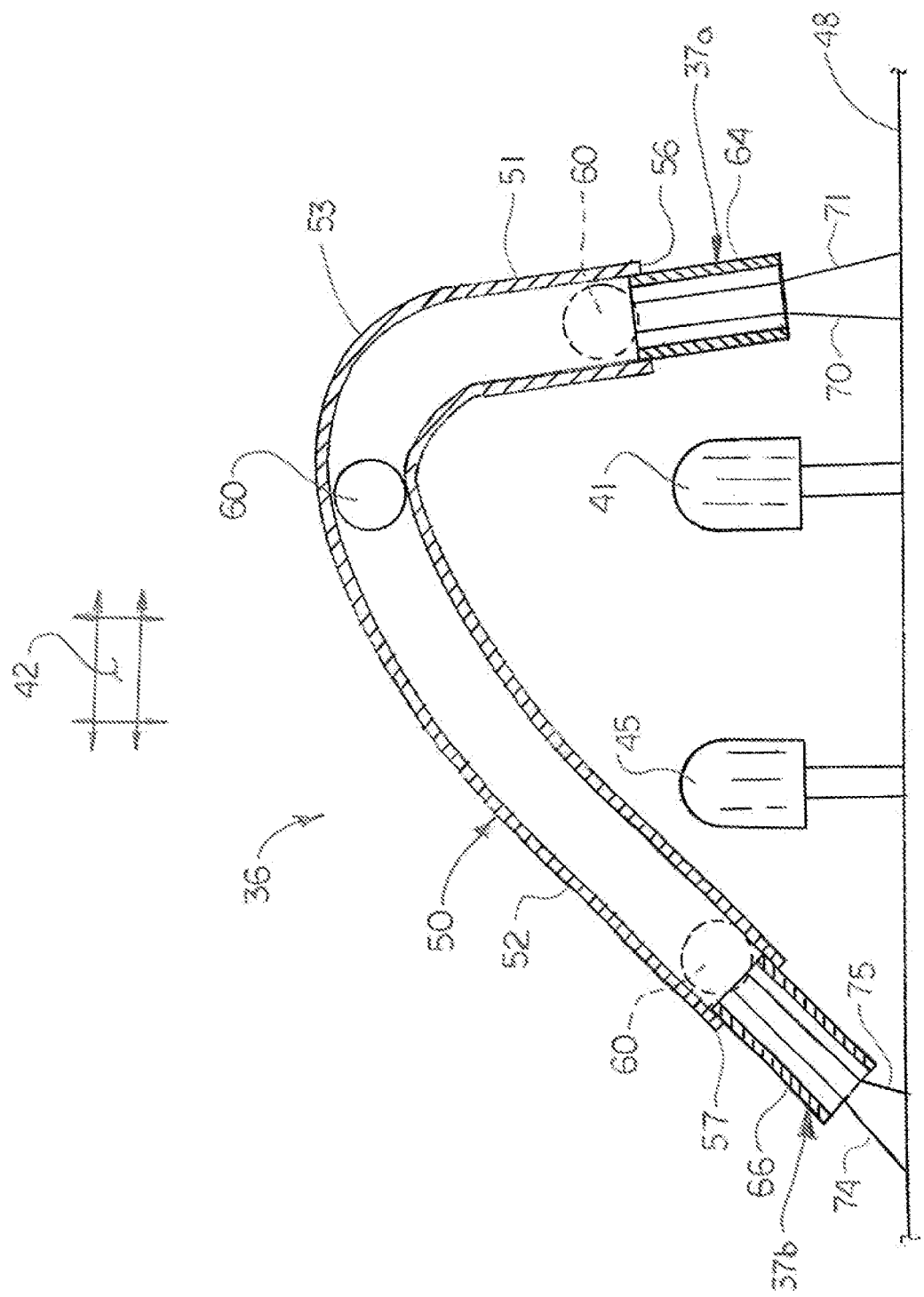
FIG. 7 is a longitudinal sectional view of a switch bead conduit, a horizontal tilt switch, and a vertical tilt switch of the indicator illumination assembly, with a position switch bead disposed in the switch bead conduit and alternately closing the horizontal tilt switch and the vertical tilt switch depending on the horizontal or vertical position, respectively, of the indicator.

As illustrated in FIG. 7, the horizontal tilt switch 37a of the indicator illumination assembly 36 may have a pair of spaced-apart horizontal tilt switch contacts 70, 71. The vertical tilt switch 37*b* of the indicator illumination assembly 36 may have a pair of spaced-apart vertical tilt switch contacts 74, 75. A switch bead conduit 50 may be disposed in communication with the horizontal tilt switch contacts 70, 71 of the horizontal tilt switch 37*a* and with the vertical tilt switch contacts 74, 75 of the vertical tilt switch 37*b*. The switch bead conduit 50 may be disposed within the vertical tilt plane 42 of the indicator 1.

Figure 8:
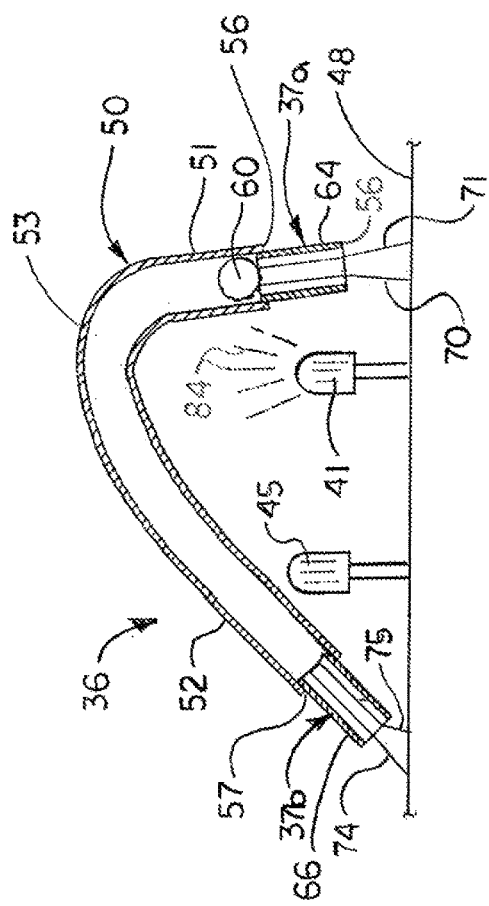
FIG. 8 is a longitudinal sectional view of the switch bead conduit, the horizontal tilt switch, and the vertical tilt switch of the indicator illumination assembly, with the switch bead closing the horizontal tilt switch to illuminate a pre-strike indicator light of the assembly when the visible fish strike indicator is oriented in the horizontal position on the water body.
Figure 9:
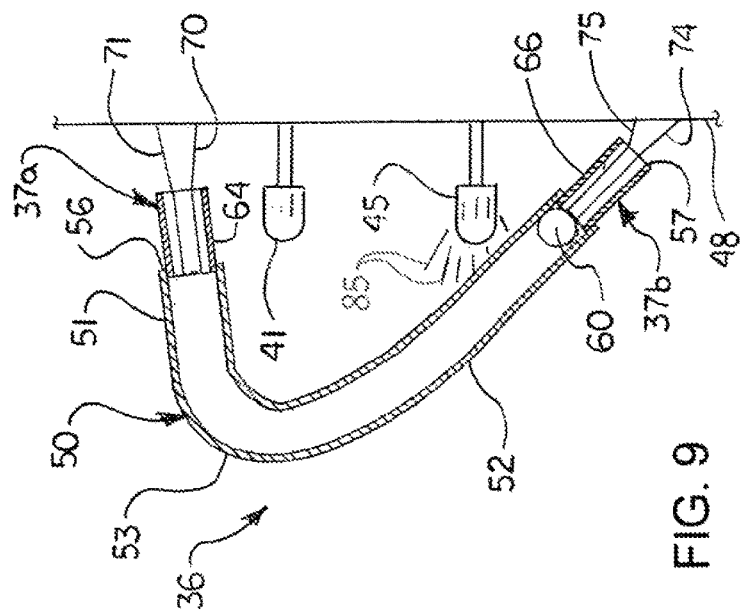
FIG. 9 is a longitudinal sectional view of the switch bead conduit, the horizontal tilt switch, and the vertical tilt switch of the indicator illumination assembly, with the switch bead closing the vertical tilt switch to illuminate a strike indicator light of the assembly to indicate that a fish is hooked on a fishing line when the visible fish strike indicator is oriented in the vertical position on the water body.

At least one electrically conductive position switch bead 60 may be disposed in the switch bead conduit 50. The position switch bead 60 may be configured to traverse the length of the switch bead conduit 50 as the indicator 1 deploys from the upright horizontal position to the vertical position on the water body 80. Accordingly, as illustrated in FIG. 8, the switch bead conduit 50 may be configured to direct the position switch bead 60 into contact with the horizontal tilt switch contacts 70, 71 of the horizontal tilt switch 37*a* in the upright horizontal position of the indicator (FIG. 14) to close the horizontal position circuit 40 and energize the pre-strike indicator light 41. Conversely, as illustrated in FIG. 9, the switch bead conduit 50 may be configured to redirect the position switch bead 60 from contact with the horizontal tilt switch contacts 70, 71 and into contact with the vertical tilt switch contacts 74, 75 of the vertical tilt switch 37*b* in the vertical position of the indicator 1, as illustrated in FIG. 15, responsive to the vertical positioning event in which the indicator 1 deploys from the upright horizontal position to the vertical position. The position switch bead 60 may thus open the horizontal position circuit 40 and then close the vertical position circuit 44 to energize the strike indicator light 45. The switch bead conduit 50 may further be configured to maintain the position switch bead 60 in contact with the vertical tilt switch contacts 74, 75 of the vertical tilt switch 37*b* to maintain the vertical position circuit 44 in the closed position and energizing of the strike indicator light 45 upon return deployment of the indicator 1 from the vertical position back to the upright horizontal position after the vertical positioning event, as illustrated in FIG. 16.

As illustrated in FIG. 7, the horizontal tilt switch 37*a* of the indicator illumination assembly 36 may have a horizontal tilt switch housing 64 at a horizontal switch end 56 of the switch bead conduit 50. The horizontal tilt switch contacts 70, 71 may be disposed in parallel, spaced-apart relationship to each other in the horizontal tilt switch housing 64. The vertical tilt switch 37*b* of the indicator illumination assembly 36 may have a vertical tilt switch housing 66 at a vertical switch end 57 of the switch bead conduit 50. The vertical tilt switch contacts 74, 75 may be disposed in parallel, spaced-apart relationship to each other in the vertical tilt switch housing 66.

Figure 10:
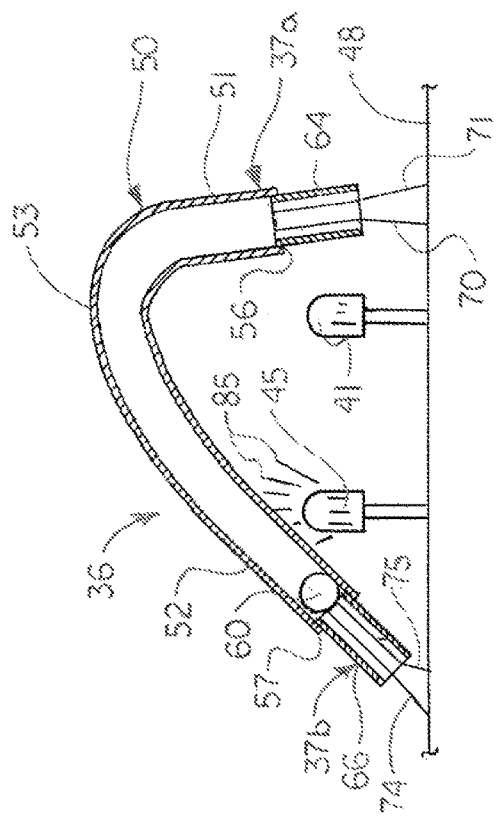
FIG. 10 is a longitudinal sectional view of the switch bead conduit, the horizontal tilt switch, and the vertical tilt switch of the indicator illumination assembly, with the switch bead continuing to close the vertical tilt switch for continued illumination of the strike indicator light of the assembly after the visible fish strike indicator has reoriented from the vertical position back to the horizontal position.

As further illustrated in FIGS. 7-10, in some embodiments, the switch bead conduit 50 of the indicator illumination assembly 36 may include a vertical conduit portion 51 disposed in communication with the horizontal tilt switch contacts 70, 71 of the horizontal tilt switch 37*a*. The vertical conduit portion 51 may extend upwardly from the horizontal tilt switch 37*a*. A conduit bend 53 may arc from the vertical conduit portion 51. A sloped conduit portion 52 may angle downwardly from the conduit bend 53. The sloped conduit portion 52 may be disposed in communication with the vertical tilt switch contacts 74, 75 of the vertical tilt switch 37*b*. Accordingly, the vertical conduit portion 51 of the switch bead conduit 50 may be configured to direct the position switch bead 60 into contact with the horizontal tilt switch contacts 70, 71 of the horizontal tilt switch 37*a*, as illustrated in FIG. 7, in the upright horizontal position (FIG. 14) of the indicator 1. The conduit bend 53 and the sloped conduit portion 52, respectively, of the switch bead conduit 50 may be configured to redirect the position switch bead 60 from contact with the horizontal tilt switch contacts 70, 71 of the horizontal tilt switch 37*a* into contact with the vertical tilt switch contacts 74, 75 of the vertical tilt switch 37*b* responsive to the vertical positioning event in which the indicator 1 deploys from the upright horizontal position to the vertical position (FIG. 15). The sloped conduit portion 52 of the switch bead conduit 50 may be configured to maintain the position switch bead 60 in contact with the vertical tilt switch contacts 74, 75 of the vertical tilt switch 37*b* to keep the vertical position circuit 44 closed for continued energizing of the strike indicator light 45 upon return deployment of the indicator 1 from the vertical position back to the upright horizontal position (FIG. 16) after the vertical positioning event, as illustrated in FIG. 10.

In typical application of the indicator 1, the light housing 20 may initially be detached from the main housing 2 to render accessible the indicator illumination assembly 36. In some embodiments, this may be accomplished by unthreading the housing shoulder threads 28 on the light housing sidewall 21 of the light housing 20 from the companion nipple threads 17 on the housing nipple 16 of the main housing 2, as illustrated in FIG. 6. The power switch 39 (FIGS. 11 and 12) may be manipulated from the "OFF" position to the "ON" position to energize the horizontal position circuit 40 having the pre-strike indicator light 41 and the vertical position circuit 44 having the strike indicator light 45. The light housing 20 may then be replaced on the main housing 2. The indicator 1 may be rotated to the right or in the clockwise direction of the horizontal position, as indicated by the arrow 96 illustrated in FIG. 2, to ensure that the switch bead conduit 50 directs the position switch bead 60 into contact with the horizontal tilt switch contacts 70, 71 of the horizontal tilt switch 37*a*, as illustrated in FIG. 8, to close the horizontal position circuit 40 and energize the pre-strike indicator light 41. The pre-strike indicator light 41 may thus emit the pre-strike light pattern 84 typically through the light housing 20 of the indicator 1.

The user of the indicator 1 may carry the indicator 1 to a selected location on the water body 80 by boat, for example. As illustrated in FIGS. 14-16, the fishing line 81 may be unwound from the line attachment cleat 10. The fishing lure 76 may be tied on the end of the fishing line 81. The unwound fishing line 81 with the fishing lure 76 thereon may be dropped and submerged beneath the surface of the water body 80 and the indicator 1 placed on the surface of the water body 80. As the indicator 1 continues to emit the pre-strike light pattern 84, the user may leave the indicator 1 at the selected location on the surface of the water body 80. As the remote user continues to periodically observe the indicator 1 from a distance, continued emission of the pre-strike light pattern 84 from the indicator 1 may indicate that the fish 94 has not become hooked on the fishing line 81.

In the event that the fish 94 subsequently strikes the fishing lure 76 and becomes hooked on the fishing line 81, the fish 94 may exert the downward force 78 on the fishing line 81, as illustrated in FIG. 15. Accordingly, the indicator 1 may deploy from the upright horizontal position illustrated in FIG. 14 to the vertical position illustrated in FIG. 15. This vertical positioning event may cause the position switch bead 60 to travel from the horizontal tilt switch 37*a* through the vertical conduit portion 51, the conduit bend 53 and the sloped conduit portion 52, respectively, of the switch bead conduit 50, and into contact with the vertical tilt switch contacts 74, 75 of the vertical tilt switch 37*b*, as illustrated in FIG. 9. The switch bead 60 may thus open the horizontal position circuit 40 and close the vertical position circuit 44 of the indicator illumination assembly 36 to extinguish the pre-strike indicator light 41 and energize the strike indicator light 45, respectively. The strike indicator light 45 may thus emit the strike light pattern 85 typically through the light housing 20 of the indicator 1. The strike light pattern 85 may indicate to the remote user that the fish 94 has become hooked on the fishing line 81 such that the user can then approach and retrieve the indicator 1 for removal of the fish 94 from the fishing lure 76. As illustrated in FIG. 10, it will be appreciated by those skilled in the art that, due to the configuration of the sloped conduit portion 52 of the switch bead conduit 50, the position switch bead 60 may remain in contact with the vertical tilt switch contacts 74, 75 of the vertical tilt switch 37b and keep the vertical position circuit 45 closed to continue to energize the strike indicator light 45 after the indicator 1 subsequently returns to the upright horizontal position on the water body 80, as illustrated in FIG. 16.

While the preferred embodiments of the invention have been described above, it will be recognized and understood that various modifications may be made in the invention and the appended claims are intended to cover all such modifications which may fall within the spirit and scope of the invention.

We claim:

1. A visible fish strike indicator, comprising:
a buoyant main housing having a horizontal center axis and a center of gravity beneath the horizontal center axis, whereby the main housing is configured to normally float in an upright horizontal position on a water body;
a light-transmissible light housing having a light housing interior detachably supported by the main housing;
an indicator illumination assembly supported by the main housing, the indicator illumination assembly including:
at least one tilt switch configured to sense a vertical positioning event wherein the main housing deploys from the upright horizontal position to a vertical position, the at least one tilt switch comprising: a horizontal tilt switch having a pair of spaced-apart horizontal tilt switch contacts; a vertical tilt switch in spaced-apart relationship to the horizontal tilt switch, the vertical tilt switch having a pair of spaced-apart vertical tilt switch contacts; a switch bead conduit disposed within the vertical tilt plane and in communication with the horizontal tilt switch contacts of the horizontal tilt switch and the vertical tilt switch contacts of the vertical tilt switch; at least one electrically conductive position switch bead in the switch bead conduit; wherein the switch bead conduit is configured to direct the at least one position switch bead into contact with the horizontal tilt switch contacts of the horizontal tilt switch in the upright horizontal position of the main housing portion; and wherein the switch bead conduit is configured to redirect the at least one position switch bead from the contact with the horizontal tilt switch contacts of the horizontal tilt switch into contact with the vertical tilt switch contacts of the vertical tilt switch responsive to the vertical positioning event wherein the main housing deploys from the upright horizontal position to the vertical position;
a power source interfacing with the at least one tilt switch;
a strike indicator light interfacing with the at least one tilt switch and the power source, the strike indicator light configured to emit a strike light pattern in the light housing; and
wherein the at least one tilt switch is configured to energize the strike indicator light to emit the strike light pattern upon sensing the vertical positioning event.

2. The visible fish strike indicator of claim 1 wherein the light housing threadably engages the main housing.

3. The visible fish strike indicator of claim 1 further comprising a line attachment cleat extending from the main housing.

4. The visible fish strike indicator of claim 3 wherein the line attachment cleat is disposed beneath the horizontal center axis of the main housing.

5. The visible fish strike indicator of claim 1 further comprising a pre-strike indicator light configured to emit a pre-strike light pattern in the light housing and interfacing with the at least one tilt switch of the indicator illumination assembly, the at least one tilt switch configured to energize the pre-strike indicator light in the upright horizontal position of the main housing in the absence of the vertical positioning event.

6. The visible fish strike indicator of claim 1 wherein the tilt switch is configured to continue to energize the strike indicator light after return deployment of the main housing to the upright horizontal position after the vertical positioning event.

7. The visible fish strike indicator of claim 1 wherein the main housing comprises a main housing sidewall having a lower main housing sidewall portion, a main housing end wall closing the main housing sidewall, and a main housing interior formed by the main housing sidewall and the main housing end wall.

8. The visible fish strike indicator of claim 1 wherein the light housing threadably engages the main housing.

9. A visible fish strike indicator, comprising:
a buoyant main housing having a horizontal center axis and a center of gravity beneath the horizontal center axis, whereby the main housing is configured to normally float in an upright horizontal position on a water body;
a line attachment cleat on the main housing, the line attachment cleat configured to facilitate attachment of a fishing line to the main housing, the main housing configured to deploy within a vertical tilt plane from the upright horizontal position to a vertical position on the water body responsive to application of a downward force against the line attachment cleat;
an indicator illumination assembly supported by the main housing, the indicator illumination assembly including:
a horizontal tilt switch having a pair of spaced-apart horizontal tilt switch contacts;
a vertical tilt switch in spaced-apart relationship to the horizontal tilt switch, the vertical tilt switch having a pair of spaced-apart vertical tilt switch contacts;
a switch bead conduit disposed within the vertical tilt plane and in communication with the horizontal tilt switch contacts of the horizontal tilt switch and the vertical tilt switch contacts of the vertical tilt switch;
at least one electrically conductive position switch bead in the switch bead conduit;
wherein the switch bead conduit is configured to direct the at least one position switch bead into contact with the horizontal tilt switch contacts of the horizontal tilt switch in the upright horizontal position of the main housing portion; and wherein the switch bead conduit is configured to redirect the at least one position switch bead from the contact with the horizontal tilt switch contacts of the horizontal tilt switch into contact with the vertical tilt switch contacts of the vertical tilt switch responsive to a vertical positioning event wherein the main housing deploys from the upright horizontal position to the vertical position;

a power source interfacing with the horizontal tilt switch contacts of the horizontal tilt switch and with the vertical tilt switch contacts of the vertical tilt switch;

a pre-strike indicator light interfacing with the horizontal tilt switch contacts of the horizontal tilt switch and the power source, the pre-strike indicator light configured to emit a pre-strike light pattern; and a strike indicator light interfacing with the vertical tilt switch contacts of the vertical tilt switch and the power source, the strike indicator light configured to emit a strike light pattern different from the pre-strike light pattern.

10. The visible fish strike indicator of claim 9 further comprising a light transmissible light housing having a light housing interior supported by the main housing, and wherein the pre-strike indicator light and the strike indicator light of the indicator illumination assembly are disposed in the light housing interior.

11. The visible fish strike indicator of claim 10 wherein the light housing detachably engages the main housing.

12. The visible fish strike indicator of claim 9 wherein the main housing comprises a main housing sidewall having a lower main housing sidewall portion; a main housing end wall closing the main housing sidewall; a main housing interior formed by the main housing sidewall and the main housing end wall; and a ballast portion at the lower main housing sidewall portion of the main housing sidewall.

13. The visible fish strike indicator of claim 12 wherein the ballast portion comprises a thickening of the lower main housing sidewall portion.

14. The visible fish strike indicator of claim 12 wherein the line attachment cleat extends from the main housing end wall of the main housing.

15. The visible fish strike indicator of claim 9 wherein the switch bead conduit is configured to maintain the at least one position switch bead in contact with the vertical tilt switch contacts of the vertical tilt switch for continued energizing of the strike indicator light after return deployment of the main housing from the vertical position to the upright horizontal position after the vertical positioning event.

16. The visible fish strike indicator of claim 9 wherein the pre-strike light pattern and the strike light pattern are different colors.

17. A visible fish strike indicator, comprising:
a buoyant main housing including a main housing sidewall and a main housing end wall on the main housing sidewall, the main housing having a horizontal center axis and a center of gravity beneath the horizontal center axis, whereby the main housing is configured to normally float in an upright horizontal position on a water body;
a line attachment cleat on the main housing end wall of the main housing, the line attachment cleat configured to facilitate attachment of a fishing line to the main housing, the main housing configured to deploy within a vertical tilt plane from the upright horizontal position to a vertical position on the water body responsive to application of a downward force against the line attachment cleat;
a light transmissive light housing supported by the main housing, the light housing having a light housing interior;
an indicator illumination assembly supported by the main housing in the light housing interior of the light housing, the indicator illumination assembly including:
an assembly support;
a horizontal tilt switch on the assembly support, the horizontal tilt switch having a pair of spaced-apart horizontal tilt switch contacts;
a vertical tilt switch on the assembly support in spaced-apart relationship to the horizontal tilt switch, the vertical tilt switch having a pair of spaced-apart vertical tilt switch contacts;
a switch bead conduit disposed within the vertical tilt plane, the switch bead conduit including:
a vertical conduit portion disposed in communication with the horizontal tilt switch contacts of the horizontal tilt switch;
a conduit bend extending from the vertical conduit portion; and
a sloped conduit portion extending from the conduit bend, the sloped conduit portion disposed in communication with the vertical tilt switch contacts of the vertical tilt switch;
at least one electrically conductive position switch bead in the switch bead conduit;
wherein the switch bead conduit is configured to direct the at least one position switch bead into contact with the horizontal tilt switch contacts of the horizontal tilt switch in the upright horizontal position of the main housing portion;
wherein the switch bead conduit is configured to redirect the at least one position switch bead from the contact with the horizontal tilt switch contacts of the horizontal tilt switch into contact with the vertical tilt switch contacts of the vertical tilt switch responsive to a vertical positioning event wherein the main housing deploys from the upright horizontal position to the vertical position; and
wherein the sloped conduit portion of the switch bead conduit is configured to maintain the at least one position switch bead in contact with the vertical tilt switch contacts of the vertical tilt switch for continued energizing of the strike indicator light after return deployment of the main housing from the vertical position to the upright horizontal position after the vertical positioning event;
a power source interfacing with the horizontal tilt switch contacts of the horizontal tilt switch and with the vertical tilt switch contacts of the vertical tilt switch;
a pre-strike indicator light interfacing with the horizontal tilt switch contacts of the horizontal tilt switch and the power source, the pre-strike indicator light configured to emit a pre-strike light pattern; and
a strike indicator light interfacing with the vertical tilt switch contacts of the vertical tilt switch and the power source, the strike indicator light configured to emit a strike light pattern different from the pre-strike light pattern.

18. The visible fish strike indicator of claim 17 wherein the light housing detachably engages the main housing.

19. The visible fish strike indicator of claim 18 further comprising a housing nipple extending from the main housing sidewall of the main housing, and wherein the light housing detachably engages the housing nipple.

20. The visible fish strike indicator of claim 17 further comprising at least one power switch interfacing with the horizontal tilt switch, the vertical tilt switch, and the power source.

\* \* \* \* \*